US012021725B1

United States Patent
Hulick, Jr. et al.

(10) Patent No.: US 12,021,725 B1
(45) Date of Patent: Jun. 25, 2024

(54) ANOMALY DRIVEN TELEMETRY SAMPLING USING INTELLIGENT TRACERS AND PARENT SPANS

(71) Applicant: Cisco Technology, Inc., San Jose, CA (US)

(72) Inventors: Walter Theodore Hulick, Jr., Pearland, TX (US); Piotr Findeisen, Rocklin, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/749,405

(22) Filed: May 20, 2022

(51) Int. Cl.
*H04L 43/10* (2022.01)
*H04L 43/028* (2022.01)
*H04L 69/22* (2022.01)

(52) U.S. Cl.
CPC ............ *H04L 43/10* (2013.01); *H04L 43/028* (2013.01); *H04L 69/22* (2013.01)

(58) Field of Classification Search
None
See application file for complete search history.

(56) References Cited

U.S. PATENT DOCUMENTS

| 11,297,144 B2 | 4/2022 | Sathianarayanan et al. |
| 2009/0208206 A1* | 8/2009 | Madrahalli ........... H04L 45/026 398/58 |
| 2011/0016207 A1* | 1/2011 | Goulet ................. G06Q 10/06 709/224 |
| 2021/0149787 A1* | 5/2021 | Nguyen ............. G06F 11/3636 |
| 2021/0329354 A1* | 10/2021 | Guim Bernat .......... H04Q 9/00 |

(Continued)

FOREIGN PATENT DOCUMENTS

CN   110888780   3/2020

OTHER PUBLICATIONS

Zach, Tom, "OpenTelemetry Sampling: Everything You Need to Know", online: https://www.aspecto.io/blog/opentelemetry-sampling-everything-you-need-to-know/, Nov. 21, 2021, accessed May 18, 2022, 12 pages, Aspecto.io.

(Continued)

*Primary Examiner* — John A Follansbee
*Assistant Examiner* — Kamal M Hossain
(74) *Attorney, Agent, or Firm* — BEHMKE INNOVATION GROUP LLC; James M. Behmke; James J. Wong

(57) ABSTRACT

In one embodiment, an illustrative method herein may comprise: initiating, by a device, a transaction trace that passes through a plurality of downstream tracers configured to collect a temporarily cached span of telemetry information regarding the transaction trace; receiving, by the device, an indication of a trigger event at a given span along the transaction trace from a particular one of the plurality of downstream tracers; deciding, by the device and based on the trigger event, whether to trigger a sharing of the temporarily cached span of telemetry information regarding the transaction trace from each of the plurality of downstream tracers; and sending, by the device in response to deciding to trigger the sharing, a signal to the plurality of downstream tracers to cause the plurality of downstream tracers to share their temporarily cached span of telemetry information regarding the transaction trace with a telemetry collector.

18 Claims, 9 Drawing Sheets

(56) References Cited

U.S. PATENT DOCUMENTS

2021/0397500 A1 12/2021 Wieder et al.
2022/0019512 A1 1/2022 Renie et al.
2022/0050902 A1 2/2022 Hulick, Jr.

OTHER PUBLICATIONS

"OpenTelemetry Best Practices: Sampling", online: https://opentelemetry.lightstep.com/best-practices/sampling/, accessed May 18, 2022, 13 pages.

* cited by examiner

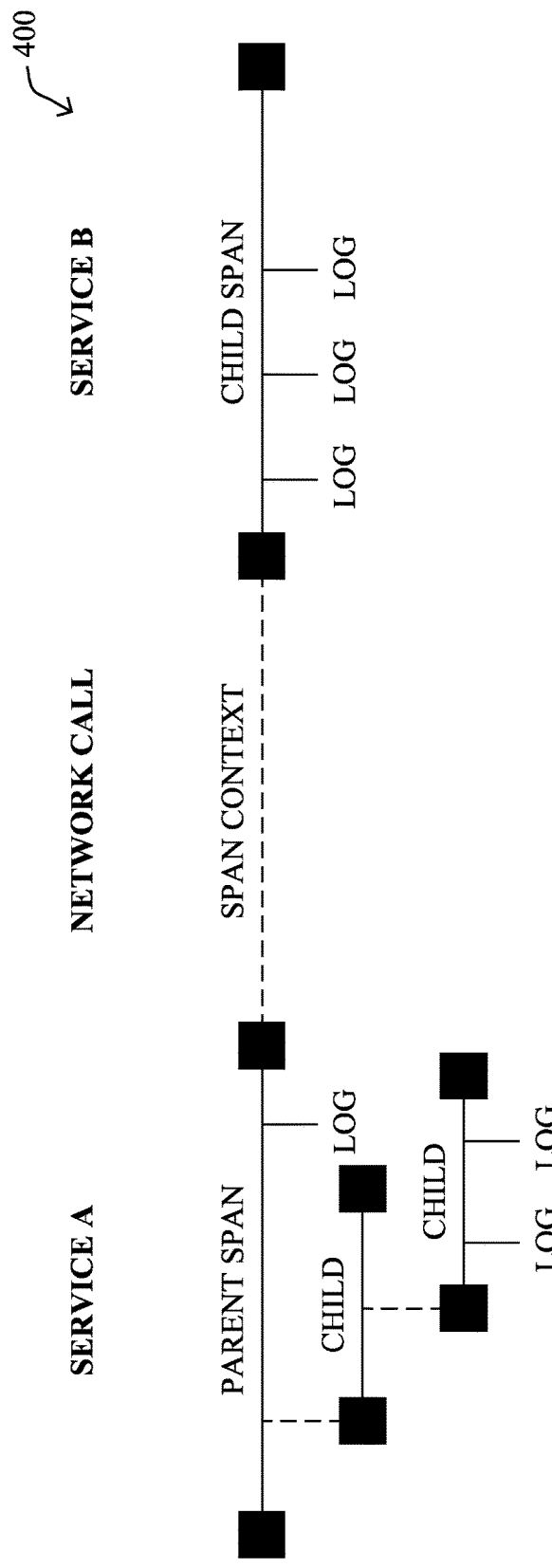

FIG. 4

1. Trace: The description of a transaction as it moves through a distributed system.

2. Span: A named, timed operation representing a piece of the workflow. Spans accept key:value tags as well as fine-grained, timestamped, structured logs attached to the particular span instance.

3. Span context: Trace information that accompanies the distributed transaction, including when it passes the service to service over the network or through a message bus. The span context contains the trace identifier, span identifier, and any other data that the tracing system needs to propagate to the downstream service.

ANOMALY DRIVEN TELEMETRY SAMPLING USING INTELLIGENT TRACERS AND PARENT SPANS

TECHNICAL FIELD

The present disclosure relates generally to computer systems, and, more particularly, to anomaly driven telemetry sampling using intelligent tracers and parent spans.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

Notably, OpenTelemetry represents a massive shift from proprietary application monitoring systems, such as application performance monitoring (APM) solutions, to an infrastructure that leverages application programming interfaces (APIs) that are standardized and open. OpenTelemetry is also quickly becoming an important cornerstone of the Cloud Native Computing Foundation.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 illustrates an example of a distributed transaction;

DESCRIPTION OF EXAMPLE EMBODIMENTS

Overview

According to one or more embodiments of the disclosure, an illustrative method herein may comprise: initiating, by a device, a transaction trace that passes through a plurality of downstream tracers configured to collect a temporarily cached span of telemetry information regarding the transaction trace; receiving, by the device, an indication of a trigger event at a given span along the transaction trace from a particular one of the plurality of downstream tracers; deciding, by the device and based on the trigger event, whether to trigger a sharing of the temporarily cached span of telemetry information regarding the transaction trace from each of the plurality of downstream tracers; and sending, by the device in response to deciding to trigger the sharing, a signal to the plurality of downstream tracers to cause the plurality of downstream tracers to share their temporarily cached span of telemetry information regarding the transaction trace with a telemetry collector.

According to one or more embodiments of the disclosure, another illustrative method herein may comprise: collecting, by a tracer device, a span of telemetry information regarding a transaction trace passing through the tracer device; caching, temporarily by the tracer device, the span of telemetry information; and sharing, by the tracer device, the span of telemetry information with a telemetry collector in response to a received signal to share.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
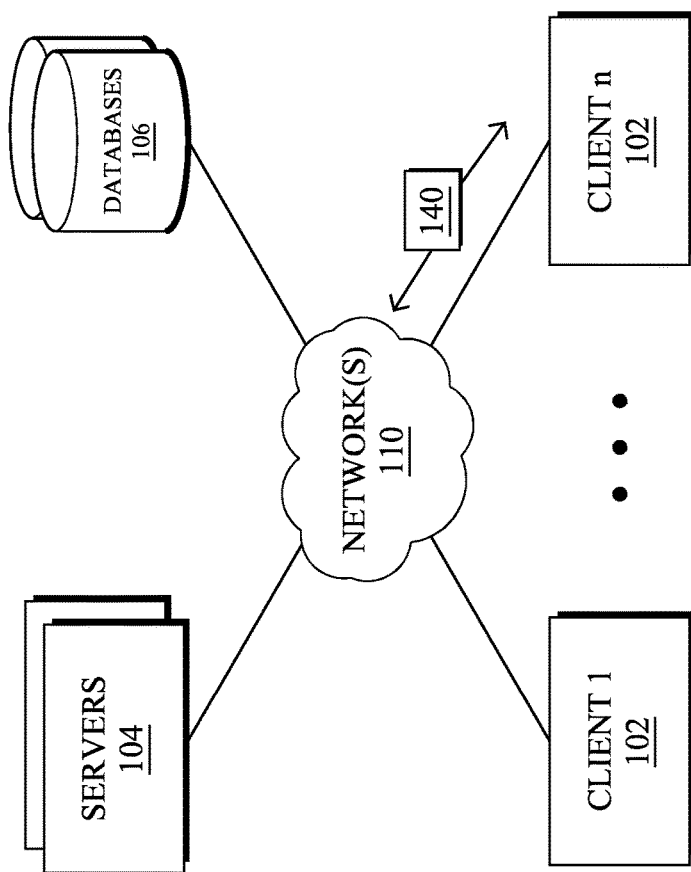
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
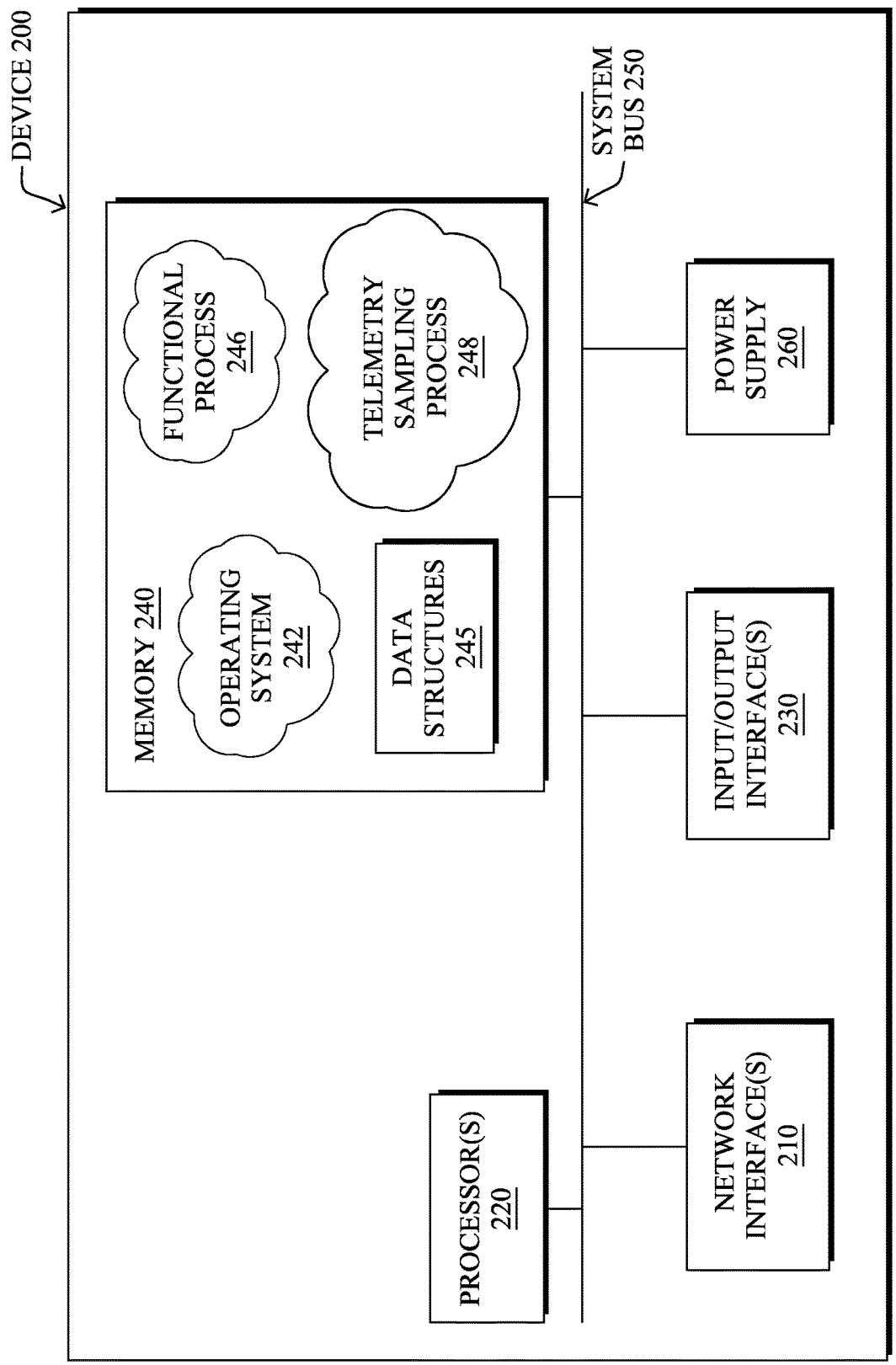
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "Telemetry Sampling" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
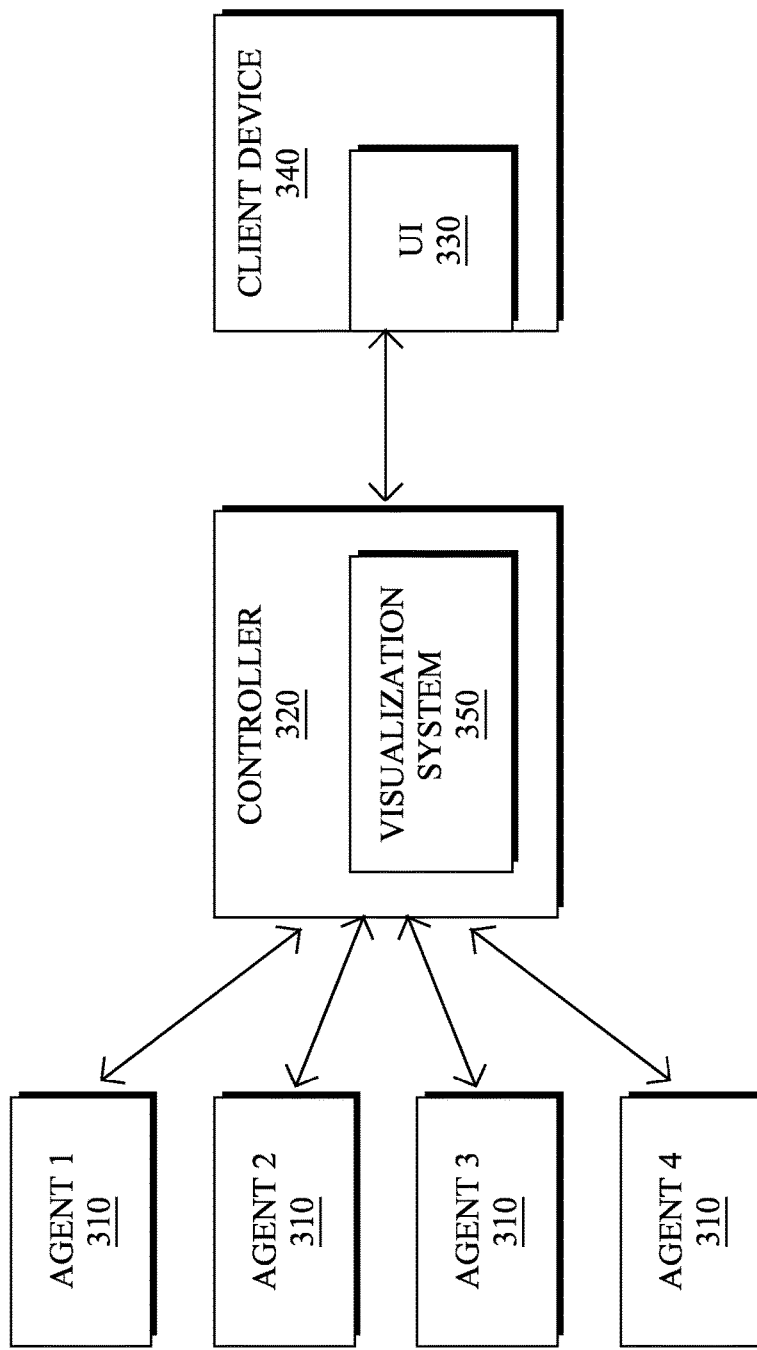
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page— e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, an instance of controller 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

—OpenTelemetry—

As noted above, OpenTelemetry represents a massive shift from proprietary application monitoring systems, such as application performance monitoring (APM) solutions, to an infrastructure that leverages application programming interfaces (APIs) that are standardized and open. OpenTelemetry is also quickly becoming an important cornerstone of the Cloud Native Computing Foundation.

In general, OpenTelemetry is the merging of OpenTracing and OpenCensus, which are two different open source standards projects which conflicted with each other. Essentially, the 'merged' technology of OpenTelemetry is focused on 'Cloud Native Computing' environments and is now part of the Cloud Native Computing Foundation (CNCF). OpenTelemetry represents a huge paradigm shift for Application Monitoring and specifically Application Tracing. By far the most popular and heavily supported platform for OpenTelemetry is Java.

To better illustrate the teachings herein, the following terminology is used:

Trace: a record of activity for a request through a distributed system. A trace is often represented as a Directed Acyclic Graph (DAG) of spans.

Spans: named, timed operations representing a single operation within a trace (e.g., a piece of the workflow). Spans can be nested to form a trace tree. Each trace contains a root span, which typically describes the end-to-end latency and (optionally) one or more sub-spans for its sub-operations. Spans also accept key:value tags as well as fine-grained, timestamped, structured logs attached to a particular span instance.

Metrics: a raw measurement about a service that are captured at runtime. OpenTelemetry defines three metric instruments: counter, measure, and observer. An observer supports an asynchronous API collecting metric data on-demand, once per collection interval.

Span Context: a span includes a span context, which is a set of globally unique identifiers that represent the unique request to which each span belongs, representing the data required for moving trace information across service boundaries. Said differently, a span context includes trace information that accompanies a distributed transaction, including when it passes the service to service over the network or through a message bus. Typically, a span context includes the trace identifier, span identifier, and any other data that the tracing system needs to propagate to the downstream service. OpenTelemetry also supports the correlation context which can carry any user-defined properties. A correlation context is not required, and components may choose not to carry or store this information.

Context Propagation: the means by which context is bundled and transferred between services, typically via HTTP headers. Context propagation is a key part of the OpenTelemetry system, and has some interesting use cases beyond tracing, such as for A/B testing. Note that OpenTelemetry supports multiple protocols for context propagation and to avoid issues, it is important that a single method be used throughout an application. So, for instance, if the W3C specification is used in one service, it should be used throughout the complete system. These are the currently supported options:

W3C Trace-Context HTTP Propagator

W3C Correlation-Context HTTP Propagator

B3 Zipkin HTTP Propagator

FIG. 4 illustrates an example of a distributed transaction 400, according to various embodiments. As shown, assume that distributed transaction 400 begins at a first service, Service A, and is handed off via a network call to a second service, Service B, as time progresses. In such a case, tracing distributed transaction 400 using OpenTelemetry will result in a parent span for the execution of distributed transaction 400 by Service A that spans several child spans. In addition, the network call to pass distributed transaction 400 to Service B will also result in a span context. This allows the tracing of distributed transaction 400 to continue as a child span of the parent span that began at Service A.

OpenTelemetry is generally focused on application performance and not on security. More specifically, OpenTelemetry seeks to merge the tracing, metrics, and logging functions from OpenTracing and OpenCensus into a single, cohesive package under the CNCF. In this context, (distributed) tracing provides insight into the full lifecycles (e.g., traces) of requests to the system, allowing failures and performance issues to be identified. Metrics provide quantitative information regarding executed processes of the system, such as gauges, histograms, and counters. Logging, in turn, provides insight into messages sent by processes that are application-specific. These three functions are also often interrelated. For instance, a subset of misbehaving traces can be identified by looking at metrics. Similarly, analysis of the logs can reveal the root cause of the behavior. New metrics can also be introduced to identify the issue earlier in time.

—Event Triggered Telemetry Sampling—

A major dilemma with OpenTelemetry centers around "sampling" of traces, where decisions are made whether to save all the traces that are created by an application, using a subset of traces to understand patterns in services and gain insights (e.g., to save costs or reduce data size). In particular, systems today cannot process every trace that takes place. This is because the network bandwidth, resources on the backend, and so on cannot scale to handle the sheer volume of telemetry data for every trace (not to mention the damage to the application eco-system). For these reasons, telemetry sampling is an acceptable practice to reduce the amount of telemetry data. However, determining which samples to take, and/or which samples to store, in order to ensure that the needed samples are obtained (e.g., relevant to performance of an application), is a problem yet to be solved.

As an overview of OpenTelemetry sampling, OpenTelemetry has three types of standard sampling: always on (all on), always off (all off), and parent-based sampling (parent decides), while the root span can be sampled at random with a predefined probability. First of all, a parent has no idea how things will go, so it is left guessing. Always on mode is not feasible, creating performance issues, an over-abundance of data, bandwidth consumption, etc. Always off, clearly a safe option in terms of reducing the amount of data/processing, also clearly results in no trace monitoring whatsoever, leaving OpenTelemetry completely blind.

Two new modes of OpenTelemetry sampling involve "predictive" head-based or tail-based sampling. However, while these modes may be a bit more accurate than those above, they still often provide results that are not what admins are looking for.

In particular, to emphasize some of the issues with current sampling techniques, sampling, simply put, controls which traces (and their respective spans) are saved. Correspondingly, the more samples saved:

More "noise" to analyze to find issues;
More storage needed for traces;
More overhead on the app;
More bandwidth spent on sending spans;
And so on.

As can be seen, it is infeasible to have a sampling policy that is "all or nothing", it is illogical to attempt random sampling to guess at which traces to capture, and predictive sampling is imperfect at best.

Moreover, determining which traces will be useful depends on the perspective of the analyzer:

For troubleshooting—only those with errors or latency issues are needed; and
For determining trends or service level agreement (SLA) compliance—it is best to have as many traces as possible in hopes that they can fully describe the user experience.

The techniques herein, therefore, address the aforementioned issues with OpenTelemetry sampling by providing for event triggered (e.g., anomaly driven) telemetry sampling using intelligent tracers and parent spans. In particular, the techniques herein add intelligent selection of OpenTelemetry span traces based on the relevance of the trace. This is in contrast to what is used today, namely unintelligent random guessing of which spans to process (to send to a collector), and/or which spans should be discarded due to space and performance considerations.

Figure 5A:
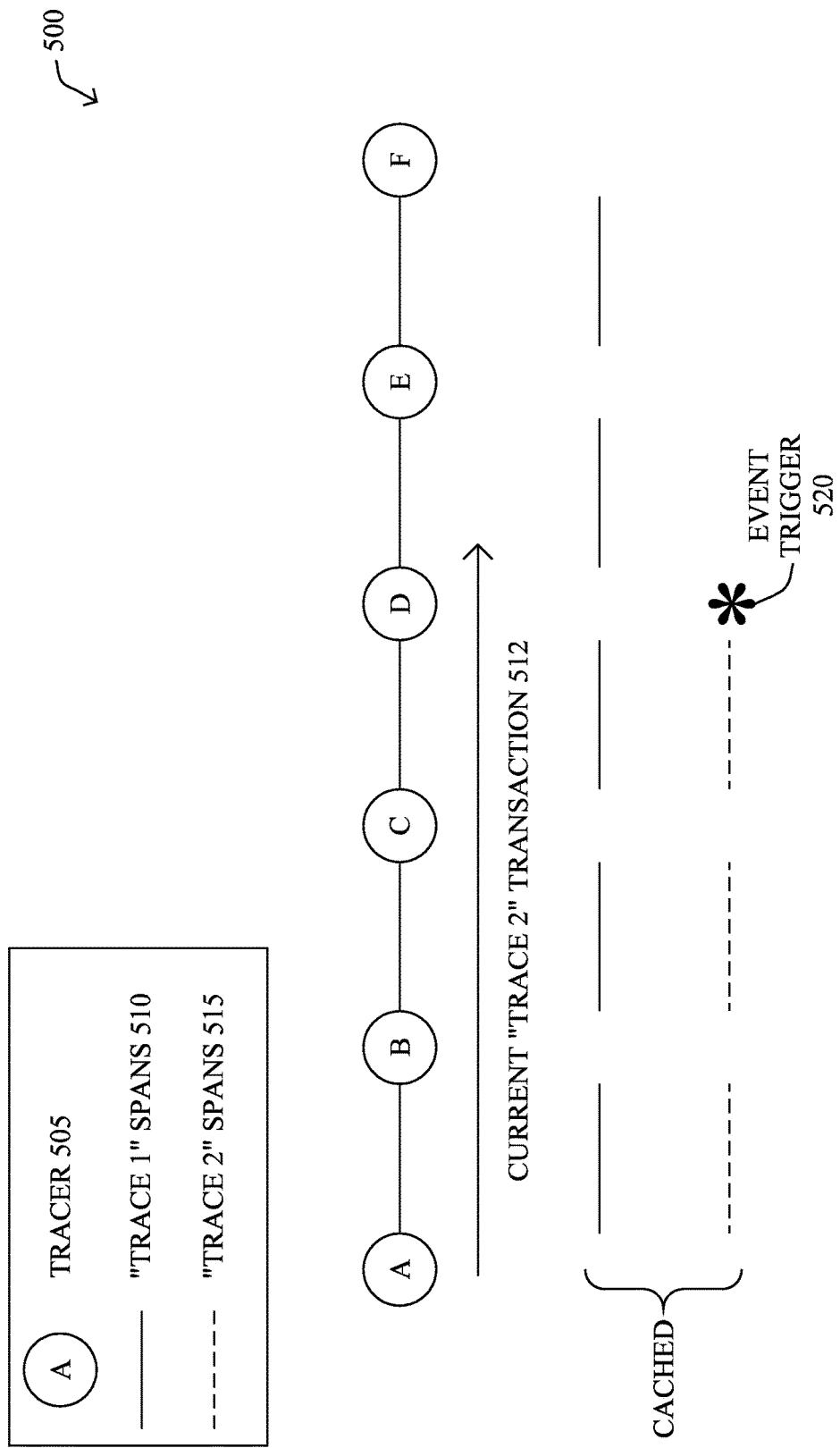
FIGS. 5A-5B illustrate an example of event triggered telemetry sampling using intelligent tracers and parent spans.

Operationally, the techniques herein provide a new method for specifically selecting (e.g., "cherry picking") traces based on a policy (i.e., no more random selection, no more predictive guessing, etc.). With reference generally to example environment 500 of FIG. 5A, showing a simplified view of a network of transactions, spans, and traces. As shown a number of OpenTelemetry tracers 505 (e.g., agents, devices, applications, etc., as will be understood in the art), "A" through "F", may process various transactions and may collect telemetry spans, such as for "Trace 1" 510 (e.g., cached from a transaction in the past, as described below), and for a current transaction 512 a corresponding "Trace 2" 515.

According to the techniques herein, the tracers are OpenTelemetry compliant, but are enhanced herein to be capable of buffering/caching (e.g., for x milliseconds) the actual span it would have sent to a collector if the tracer had been told sampling was set to "on". That is, the techniques herein configure tracers A-F to locally cache all spans based on transactions for a short time (e.g., based on a set time or a size of an associated cache) so that the span is cached, but not yet sent to a collector. For instance, as shown in FIG. 5A, spans 510 for a previous transaction corresponding to "Trace 1" have been cached, but not sent, and spans 515 for a current transaction 512 are currently being added to the cache (e.g., with a hash of the trace identifier to be able to index the particular stored span later). In particular, as described below, the enhanced tracers only store the spans at first, but do not flush their caches (send the span to a collector) unless they see an instruction to do so (e.g., an HTTP "Send from Cache" header with a Trace ID) before otherwise purging expiring spans from the cache. According to the techniques herein, such an instruction may be due to an event trigger 520, as described below.

Figure 5B:
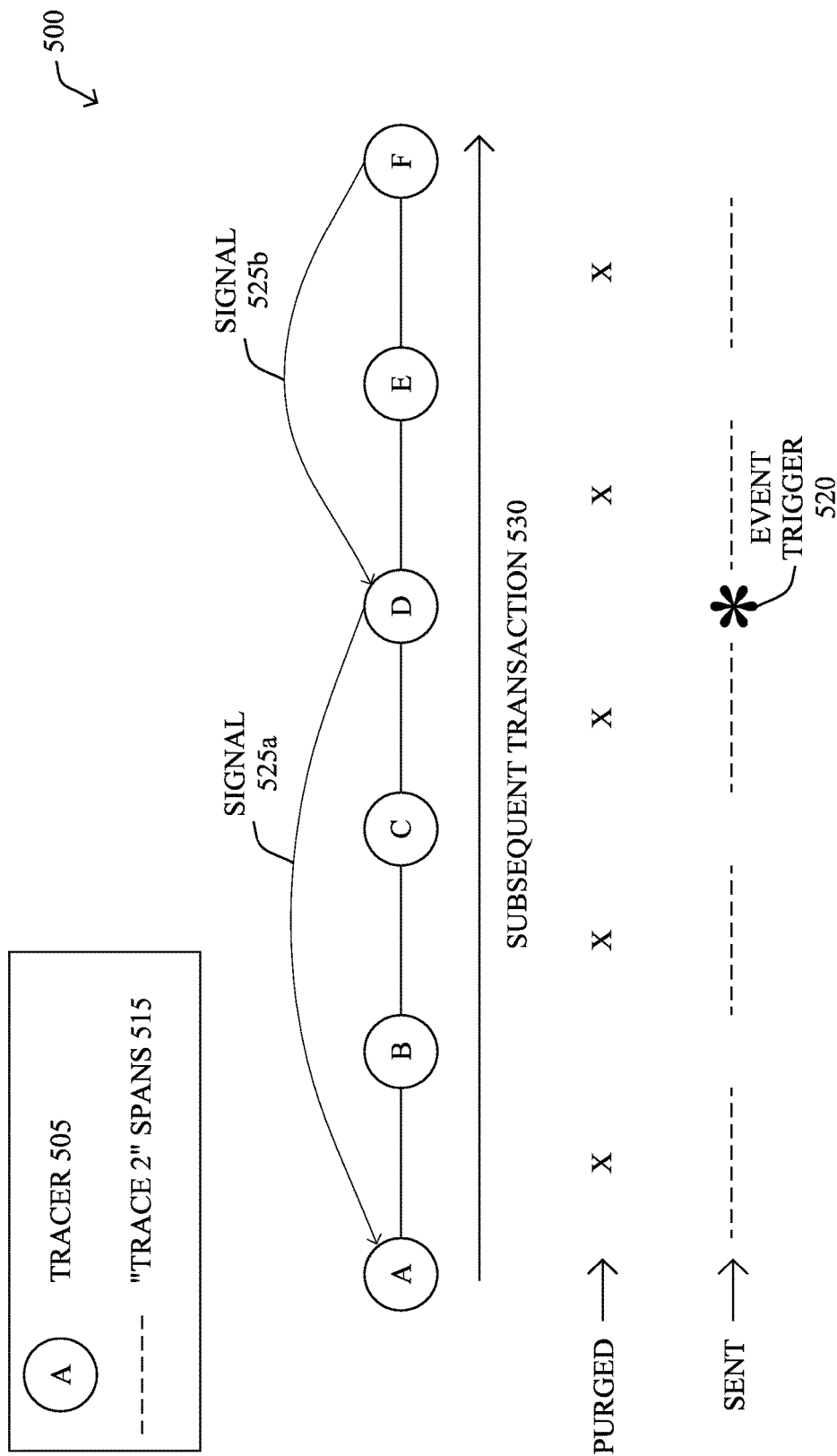

Specifically, as shown now in FIG. 5B, in one embodiment, each enhanced tracer may be configured to determine if a span is a "leaf" (no child span), such as tracer "F", and can create a signal 525 (shown as signal portion 525a and signal portion 525b, as explained below), such as an HTTP "span status header" (e.g., a JSON web token, "JWT"), that will eventually make its way back to the parent span (e.g., tracer A). Note that in one embodiment, this signal 525 would be created/added (if no child), or copied/modified (if a downstream child), only if there is something relevant in the span that makes it potentially worthy to be sampled. (In another embodiment, the signal 525 is sent for every trace, or a sampling of traces, for a complete feedback loop.) Illustrative information that may be contained within this signal may be such things as:

Status;
Errors (if exist);
Latency issues (if exist);
Exceptions (if exist);
Etc.

Note that in one embodiment, only the end of the trace (leaf, tracer F) initiates this signal 525 (signal portion 525b), and may be based on events that occurred during the transaction/trace. However, the entire trace is not needed to be able to determine a triggering event (e.g., that something "went wrong" along the way), and as such, in one embodiment the signal 525 may be initiated by any event-detecting tracer along the transaction (e.g., initiating only portion of signal portion 525a from tracer D). Note further that in an alternative embodiment, full-duplex OpenTelemetry would allow for in-band return signals 525 to send the status backwards, as opposed to using HTTP return headers, as mentioned above, or other suitable signaling technologies, accordingly.

The decision to classify an event herein may be based on any decided factors, such as, e.g., exceptions thrown, errors, child span response time too long, out of memory errors, security issues (e.g., a span running code in a vulnerable library, unpatched libraries, etc.), various other anomalies, and so on. The techniques herein, therefore, can determine these events (e.g., anomalies), and use them as triggers to go back upstream to get the entire trace for telemetry-based analysis, accordingly.

In one embodiment herein, the root span parent (e.g., tracer A) is "in control" (the starting span for the trace). That is, once the trace has completed, the parent root would review any received signals 525 (e.g., the HTTP "span status header") to see for itself whether there is anything that would trigger OpenTelemetry sampling (i.e., is the trace worth being sampled). For instance, such a determination may be based on whether there were any Errors/Exceptions that warrant sending the cached span(s) to the collector. (Note that in one embodiment, the decision whether to sample the trace may be made by any tracer along the way, and as such, the root span parent merely relays any received instructions to send cached spans, accordingly.)

If there is no reason to send the cached spans, whether because no signal 525 was received or the signal 525 indicated something that the root span parent decided was not "worthy", then the previously cached spans (e.g., for Trace 1) are allowed to expire (i.e., are purged), as the corresponding trace is not needed for telemetry analysis.

However, if the trace is worth sampling (e.g., due to event trigger 520 of Trace 2), in one embodiment, the root span parent may then send instructions to the tracers to send their cached spans for the trace. For instance, while this may be performed by out-of-band signaling, in one particular embodiment herein the root span parent may cache the trace ID for Trace 2 (e.g., and a business transaction ID), such that on a subsequent (e.g., the next) transaction 530 (assumed in general to be likely very soon afterwards), the parent would add instructions to the transaction messages (e.g., as a "Send from Cache" header) to cause the tracers to send their cached spans based on the corresponding Trace ID for Trace 2. (In still another embodiment, the root signaling may be based on first waiting for a subsequent transaction to use in-band signaling on any customer communication/transaction in order to save excess traffic, and then if no such transaction occurs prior to expiration of caches, the root may send an out-of-band signal at that time.) Notably, by using in-band signaling, follow-on instructions are much more likely to traverse the same path through the network (e.g., based on routing decisions, hash-based load balancing, etc.), and thus reach all the same tracers as the original transaction.

According to the techniques herein, therefore, the downstream enhanced tracers (B-F) would then see the instructions (e.g., "Send from Cache" header), locate the span in their cache using the Trace ID, and send that span to the collector.

Note too that as described above, where the event is detected by an intermediate tracer (e.g., tracer D initiating signal portion 525a), in one embodiment the instructions from the root span parent need only reach previous tracers (e.g., A-C) to instruct them to send their cached spans, and the rest of the current transaction 512 for Trace 2 may itself be used as the forward signal to future tracers (e.g., E-F) to send their spans to the collector (e.g., bypassing the caching).

The techniques herein, therefore, provide an event triggered manner to capture and analyze the entire trace (every span) when specifically interested in that trace, without having to send every trace every time. This delayed decision about whether to send spans, based on informing all OpenTelemetry parties (including parents) that something happened with a particular trace ID after the fact, allows for real-time collection of "worthy" traces, without the overhead of collecting every trace. The traces may then be used by analysis engines, visual dashboards, etc., presenting a flowmap of traces as-needed, including every span from such traces.

Figure 6:
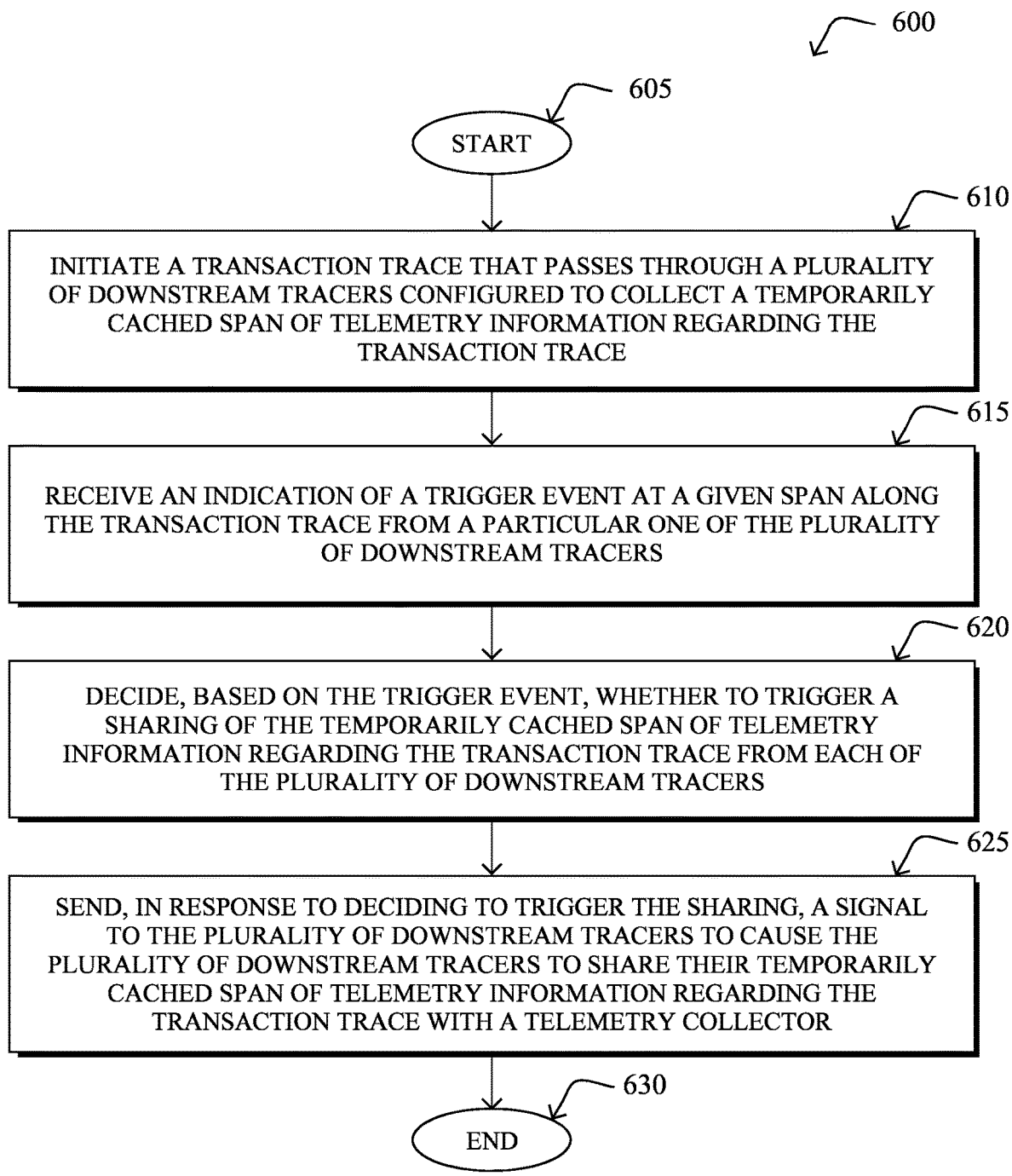
FIG. 6 illustrates an example simplified procedure for event triggered telemetry sampling using intelligent tracers and parent spans in accordance with one or more embodiments described herein, particularly from the perspective of a root span parent.

In closing, FIG. 6 illustrates an example simplified procedure 600 for event triggered telemetry sampling using intelligent tracers and parent spans in accordance with one or more embodiments described herein, particularly from the perspective of a root span parent. For example, a non-generic, specifically configured device (e.g., device 200) may perform procedure 600 by executing stored instructions (e.g., process 248). The procedure 600 may start at step 605, and continues to step 610, where, as described in greater detail above, a device (e.g., a root span parent tracer/device) initiates a transaction trace that passes through a plurality of downstream tracers configured to collect a temporarily cached span of telemetry information regarding the transaction trace.

In step 615, the device may then receive an indication of a trigger event at a given span along the transaction trace from a particular one of the plurality of downstream tracers (e.g., HTTP return packet header signaling, in-band full duplex telemetry collection signaling, etc.). Then, in step 620. the device decides, based on the trigger event, whether to trigger a sharing of the temporarily cached span of telemetry information regarding the transaction trace from each of the plurality of downstream tracers. Note that while in one embodiment the root span parent is in control of the decision (based on its own policies, configuration, knowledge, etc.), in one embodiment deciding whether to trigger the sharing of the temporarily cached span of telemetry information regarding the transaction trace may merely be based on a decision being made by the particular one of the plurality of downstream tracers to send the indication of the trigger event. (In other words, the decision is simply that an indication was received.)

As such, in step 625, in response to deciding to trigger the sharing, the device sends a signal to the plurality of downstream tracers to cause the plurality of downstream tracers to share their temporarily cached span of telemetry information regarding the transaction trace with a telemetry collector. As noted above, the signal may be an in-band signal within a header of a subsequent transaction trace, or may be an out-of-band signal to the plurality of downstream tracers (e.g., in one embodiment, first attempting to initially send the signal to the plurality of downstream tracers as an opportunistic in-band signal within a header of a subsequent transaction trace, and then deciding to send the signal to the plurality of downstream tracers as the out-of-band signal after a given amount of time and before expiration of the temporarily cached span of telemetry information regarding the transaction trace).

The simplified procedure 600 may then end in step 630, notably with the ability to continue initiating traces and awaiting word of any particular traces that are worthy of sampling, and with the telemetry collector receiving the entire transaction trace in response to an event trigger, accordingly. Other steps may also be included generally within procedure 600. For example, such steps (or, more generally, such additions to steps already specifically illustrated above), may include other techniques and/or other specific embodiments as described herein.

Figure 7:
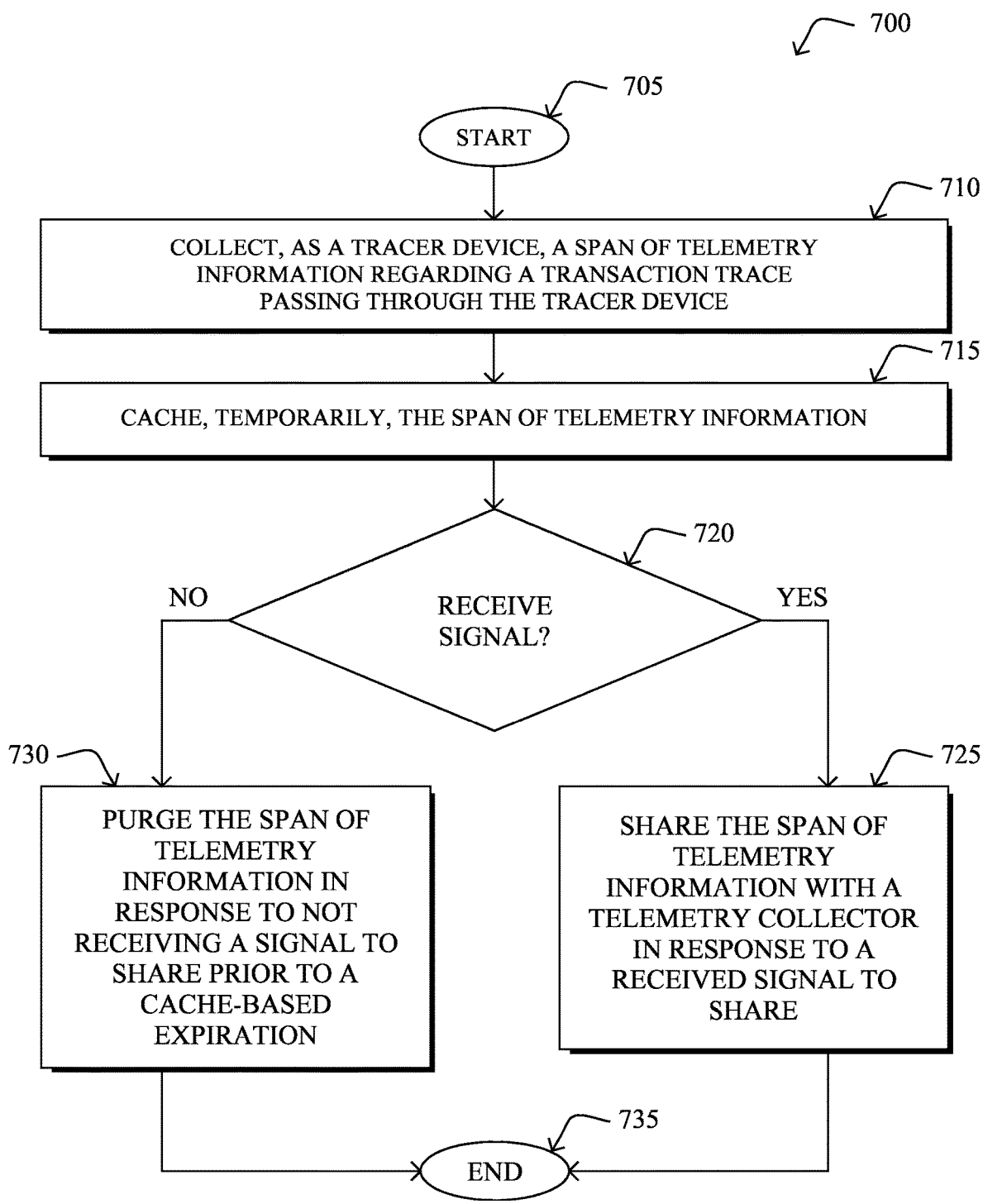
FIG. 7 illustrates another example simplified procedure for event triggered telemetry sampling using intelligent tracers and parent spans in accordance with one or more embodiments described herein, particularly from the perspective of an enhanced tracer.

In addition, FIG. 7 illustrates another example simplified procedure 700 for event triggered telemetry sampling using intelligent tracers and parent spans in accordance with one or more embodiments described herein, particularly from the perspective of an enhanced tracer. For example, a non-generic, specifically configured device (e.g., device 200) may perform procedure 700 by executing stored instructions (e.g., process 248). The procedure 700 may start at step 705, and continues to step 710, where, as described in greater detail above, a tracer device collects a span of telemetry information regarding a transaction trace passing through the tracer device, and in step 715 caches, temporarily, the span of telemetry information. If in step 720 the tracer device receives a signal to share (e.g., in response to a trigger event at a given span along the transaction trace) as described above (e.g., before expiration of the cached telemetry information corresponding to the particular transaction trace), then in step 725 the tracer device shares the span of telemetry information with a telemetry collector, as described above. (Note that where the tracer device is configured to collect a plurality of spans of telemetry information corresponding to a plurality of transaction traces passing through the tracer device, then the received signal to share comprises a trace identifier indicative of a specific transaction trace of the plurality of transaction traces.)

In response to expiration of the cached telemetry information corresponding to the particular transaction trace prior to receiving a signal in step 720 (that is, in response to not receiving a signal to share prior to a cache-based expiration), then in step 730 the tracer device may eventually purge the span of telemetry information (for that trace).

The simplified procedure 700 may then end in step 735, notably with the ability to continue collecting and caching telemetry, and awaiting instructions to send such telemetry (or else purge it), accordingly. Other steps may also be included generally within procedure 700. For example, such steps (or, more generally, such additions to steps already specifically illustrated above), may include other techniques and/or other specific embodiments as described herein.

Figure 8:
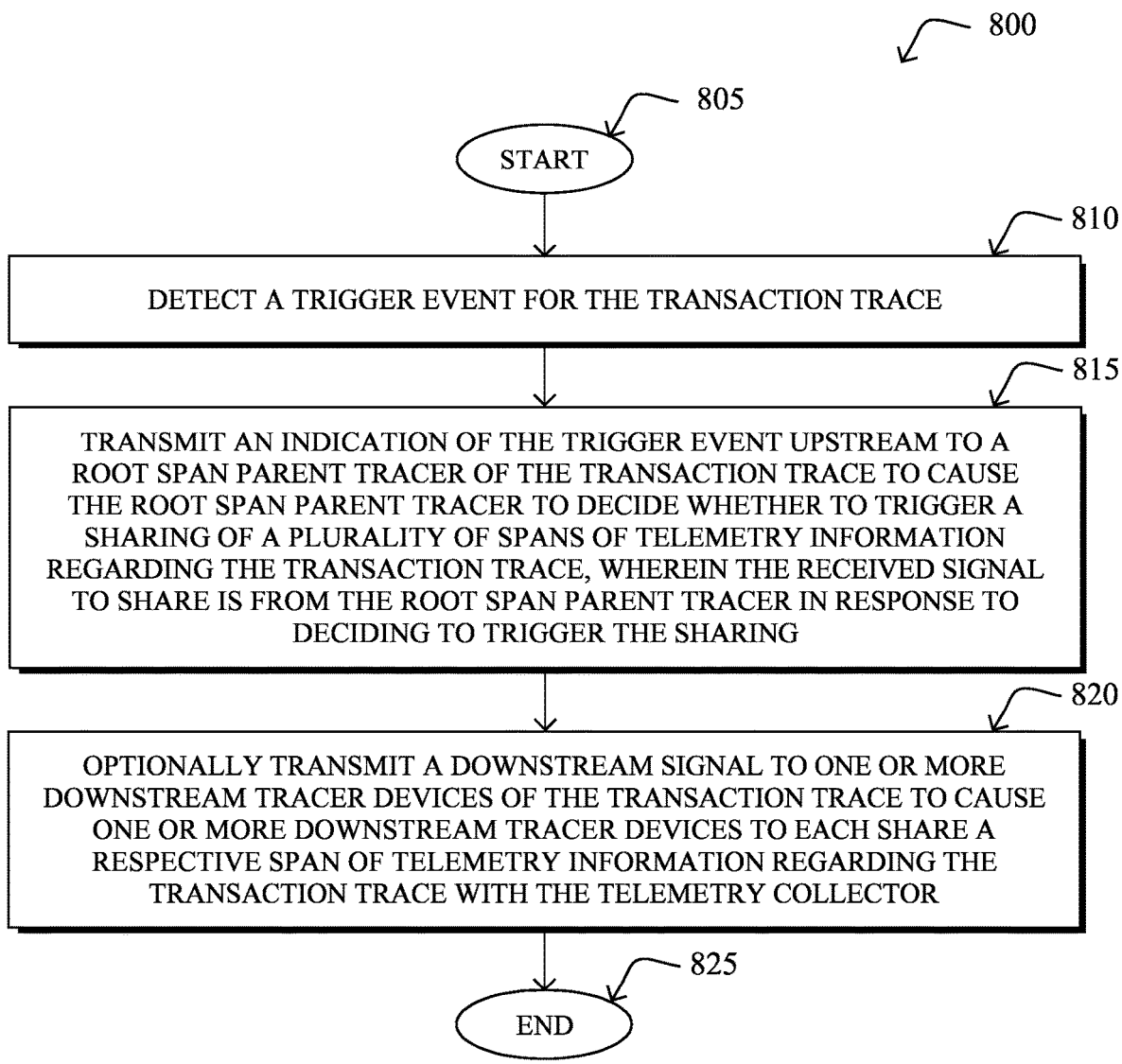
FIG. 8 illustrates still another example simplified procedure for event triggered telemetry sampling using intelligent tracers and parent spans in accordance with one or more embodiments described herein, particularly from the perspective of a triggering enhanced tracer.

Lastly, FIG. 8 illustrates still another example simplified procedure 800 for event triggered telemetry sampling using intelligent tracers and parent spans in accordance with one or more embodiments described herein, particularly from the perspective of a triggering enhanced tracer. For example, a non-generic, specifically configured device (e.g., device 200) may perform procedure 800 by executing stored instructions (e.g., process 248). The procedure 800 may start at step 805, and continues to step 810, where, as described in greater detail above, a tracer device detects a trigger event for a particular transaction trace. Notably, as described above, the tracer device may be an end device of the transaction trace (i.e., a leaf), and the trigger event for the transaction trace may have occurred at any given span along the transaction trace from a particular upstream tracer device. Alternatively, the triggering tracer device may be an intermediate tracer device at a given span along the transaction trace.

In step 815, the tracer device may then transmit an indication of the trigger event upstream to a root span parent tracer of the transaction trace to cause the root span parent tracer to decide whether to trigger a sharing of a plurality of spans of telemetry information regarding the transaction trace, as described above (i.e., where the received signal to share at the tracer devices is from the root span parent tracer in response to deciding to trigger the sharing). Again, as noted, the indication of the trigger event may be transmitted through one of either HTTP return packet header signaling or in-band full duplex telemetry collection signaling.

Note also that when the triggering tracer device is an intermediate tracer device at a given span along the transaction trace, then in one embodiment herein the procedure 800 may include, in step 820, optionally transmitting a downstream signal to one or more downstream tracer devices of the transaction trace to cause the one or more downstream tracer devices to each share a respective span of telemetry information regarding the transaction trace with the telemetry collector.

The simplified procedure 800 may then end in step 825, notably with the ability to continue monitoring for future event triggers, again with the telemetry collector receiving the entire transaction trace in response to an event trigger, accordingly. Other steps may also be included generally within procedure 800. For example, such steps (or, more generally, such additions to steps already specifically illustrated above), may include other techniques and/or other specific embodiments as described herein.

It should be noted that while certain steps within procedures 600-800 may be optional as described above, the steps shown in FIGS. 6-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-800 are described separately, certain steps from each procedure may be incorporated into each other procedure, and the procedures are not meant to be mutually exclusive.

The techniques described herein, therefore, provide for event triggered (e.g., anomaly driven) telemetry sampling using intelligent tracers and parent spans. In particular, the techniques herein vastly improve the landscape of OpenTelemetry sampling by performing sampling *after* a trace has ended, while still being able to obtain *entire* trace spans (as partial sampling of trace, i.e., some spans are sent while some are not, creates "orphan spans"). For instance, as described above, sampling does not have to take place all in the same transaction, but instead upstream signaling can be used as described herein to tell the parent span (the start of the transaction) to use the standard transaction communication to sample "after the fact" (e.g., signaled "out of band"). In addition, the techniques herein result in visible flowmaps and analysis of particular trace instances that would contain a complete trace versus only a subset of the spans, as opposed to traditional methodology.

An intelligent system as described herein is an important improvement for sampling with OpenTelemetry. The techniques herein, in particular, are buildable under only a short list of operational assumptions:

1. There is enough memory for the cache; and
2. Transactions for certain BTs will occur close enough in time that spans are still cached.

However, in most cases, these assumptions would be correct, or the system could be specifically configured in order to ensure that these assumptions are, in fact, correct.

Illustratively, the techniques described herein may be performed by hardware, software, and/or firmware, such as in accordance with the illustrative telemetry sampling process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: initiating, by a device, a transaction trace that passes through a plurality of downstream tracers configured to collect a temporarily cached span of telemetry information regarding the transaction trace; receiving, by the device, an indication of a trigger event at a given span along the transaction trace from a particular one of the plurality of downstream tracers; deciding, by the device and based on the trigger event, whether to trigger a sharing of the temporarily cached span of telemetry information regarding the transaction trace from each of the plurality of downstream tracers; and sending, by the device in response to deciding to trigger the sharing, a signal to the plurality of downstream tracers to cause the plurality of downstream tracers to share their temporarily cached span of telemetry information regarding the transaction trace with a telemetry collector.

In one embodiment, the indication of the trigger event is received through hypertext transmission protocol return packet header signaling.

In one embodiment, the indication of the trigger event is received through in-band full duplex telemetry collection signaling.

In one embodiment, the signal to the plurality of downstream tracers comprises an in-band signal within a header of a subsequent transaction trace.

In one embodiment, the signal to the plurality of downstream tracers comprises an out-of-band signal to the plurality of downstream tracers. In one embodiment, the method may further comprise: attempting to initially send the signal to the plurality of downstream tracers as an opportunistic in-band signal within a header of a subsequent transaction trace; and deciding to send the signal to the plurality of downstream tracers as the out-of-band signal after a given amount of time and before expiration of the temporarily cached span of telemetry information regarding the transaction trace.

In one embodiment, deciding whether to trigger the sharing of the temporarily cached span of telemetry information regarding the transaction trace is based on a decision being made by the particular one of the plurality of downstream tracers to send the indication of the trigger event.

According to the embodiments herein, an illustrative tangible, non-transitory, computer-readable medium herein may have computer-executable instructions stored thereon that, when executed by a processor on a computer, may cause the computer to perform a method comprising: initiating a transaction trace that passes through a plurality of downstream tracers configured to collect a temporarily cached span of telemetry information regarding the transaction trace; receiving an indication of a trigger event at a given span along the transaction trace from a particular one of the plurality of downstream tracers; deciding, based on the trigger event, whether to trigger a sharing of the temporarily cached span of telemetry information regarding the transaction trace from each of the plurality of downstream tracers; and sending, in response to deciding to trigger the sharing, a signal to the plurality of downstream tracers to cause the plurality of downstream tracers to share their temporarily cached span of telemetry information regarding the transaction trace with a telemetry collector.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: initiate a transaction trace that passes through a plurality of downstream tracers configured to collect a temporarily cached span of telemetry information regarding the transaction trace; receive an indication of a trigger event at a given span along the transaction trace from a particular one of the plurality of downstream tracers; decide, based on the trigger event, whether to trigger a sharing of the temporarily cached span of telemetry information regarding the transaction trace from each of the plurality of downstream tracers; and send, in response to deciding to trigger the sharing, a signal to the plurality of downstream tracers to cause the plurality of downstream tracers to share their temporarily cached span of telemetry information regarding the transaction trace with a telemetry collector.

Additionally, according to the embodiments herein, a second illustrative method herein may comprise: collecting, by a tracer device, a span of telemetry information regarding a transaction trace passing through the tracer device; caching, temporarily by the tracer device, the span of telemetry information; and sharing, by the tracer device, the span of telemetry information with a telemetry collector in response to a received signal to share.

In one embodiment, the second method may further comprise: purging the span of telemetry information in response to not receiving a signal to share prior to a cache-based expiration.

In one embodiment, the second method may further comprise: collecting a plurality of spans of telemetry information corresponding to a plurality of transaction traces passing through the tracer device, wherein the received signal to share comprises a trace identifier indicative of a specific transaction trace of the plurality of transaction traces.

In one embodiment, the received signal to share is in response to a trigger event at a given span along the transaction trace.

In one embodiment, the second method may further comprise: detecting a trigger event for the transaction trace; and transmitting an indication of the trigger event upstream to a root span parent tracer of the transaction trace to cause the root span parent tracer to decide whether to trigger a sharing of a plurality of spans of telemetry information regarding the transaction trace, wherein the received signal to share is from the root span parent tracer in response to deciding to trigger the sharing. In one embodiment, the tracer device is an intermediate tracer device at a given span along the transaction trace. In one embodiment, the second method may further comprise: transmitting a downstream signal to one or more downstream tracer devices of the transaction trace to cause the one or more downstream tracer devices to each share a respective span of telemetry information regarding the transaction trace with the telemetry collector. In one embodiment, the tracer device is an end device of the transaction trace, and wherein the trigger event for the transaction trace occurred at a given span along the transaction trace from a particular upstream tracer device. In one embodiment, the indication of the trigger event is transmitted through one of either hypertext transmission protocol return packet header signaling or in-band full duplex telemetry collection signaling.

In one embodiment, the second method may further comprise: receiving the received signal as one of either an in-band signal within a header of a subsequent transaction trace or an out-of-band signal.

According to the embodiments herein, a second illustrative tangible, non-transitory, computer-readable medium herein may have computer-executable instructions stored thereon that, when executed by a processor on a computer, may cause the computer to perform a method comprising: collecting, as a tracer device, a span of telemetry information regarding a transaction trace passing through the tracer device; caching, temporarily, the span of telemetry information; and sharing the span of telemetry information with a telemetry collector in response to a received signal to share.

Further, according to the embodiments herein a second illustrative apparatus herein may comprise: one or more network interfaces to communicate with a network; a processor coupled to the network interfaces and configured to execute one or more processes; and a memory configured to store a process that is executable by the processor, the process, when executed, configured to: collect, as a tracer device, a span of telemetry information regarding a transaction trace passing through the tracer device; cache, temporarily, the span of telemetry information; and share the span of telemetry information with a telemetry collector in response to a received signal to share.

According to the embodiments herein, an illustrative system herein may comprise: a root span parent tracer configured to initiate a transaction trace; a plurality of tracer devices downstream from the root span parent tracer through which pass the transaction trace, the plurality of tracer devices configured to collect a temporarily cached span of telemetry information regarding the transaction trace, a particular one of the plurality of tracer devices configured to detect a trigger event for the transaction trace and transmit an indication of the trigger event upstream to the root span parent tracer; and a telemetry collector; wherein the root span parent tracer is further configured to decide to send a signal to trigger a sharing of the temporarily cached span of telemetry information regarding the transaction trace from each of the plurality of tracer devices, wherein the plurality of tracer devices are further configured to share their temporarily cached span of telemetry information regarding the transaction trace with the telemetry collector in response to receiving the signal. In one embodiment, the indication of the trigger event is based on hypertext transmission protocol return packet header signaling. In one embodiment, the signal to the plurality of tracer devices comprises an in-band signal within a header of a subsequent transaction trace.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable subcombination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
initiating, by a root span tracer of a plurality of tracer devices, a transaction trace that passes through a plurality of downstream tracers of the plurality of tracer devices that are downstream from the root span tracer and are configured to collect a temporarily cached span of telemetry information regarding the transaction trace;
receiving, by the root span parent tracer, an indication of a trigger event at a given span along the transaction trace from a particular one of the plurality of downstream tracers;
deciding, by the root span tracer and based on the trigger event, whether to trigger a sharing of the temporarily cached span of telemetry information regarding the transaction trace from each of the plurality of downstream tracers based on a decision made by the particular one of the plurality of downstream tracers to send the indication of the trigger event; and
sending, by the root span tracer in response to deciding to trigger the sharing, a signal to the plurality of downstream tracers to cause the plurality of downstream tracers to share their temporarily cached span of telemetry information regarding the transaction trace with a telemetry collector, wherein tracers subsequent to the particular one of the plurality of downstream tracers are caused to bypass caching and send their spans of telemetry information regarding the transaction trace to the telemetry collector.

2. The method as in claim 1, wherein the indication of the trigger event is received through hypertext transmission protocol return packet header signaling.

3. The method as in claim 1, wherein the indication of the trigger event is received through in-band full duplex telemetry collection signaling.

4. The method as in claim 1, wherein the signal to the plurality of downstream tracers comprises an in-band signal within a header of a subsequent transaction trace.

5. The method as in claim 1, wherein the signal to the plurality of downstream tracers comprises an out-of-band signal to the plurality of downstream tracers.

6. The method as in claim 5, further comprising:
attempting to initially send the signal to the plurality of downstream tracers as an opportunistic in-band signal within a header of a subsequent transaction trace; and
deciding to send the signal to the plurality of downstream tracers as the out-of-band signal after a given amount of time and before expiration of the temporarily cached span of telemetry information regarding the transaction trace.

7. A method, comprising:
collecting, by a tracer device of a plurality of tracer devices, a span of telemetry information regarding a transaction trace passing through the tracer device, the tracer device being downstream from a root span tracer of the plurality of tracer devices;
caching, temporarily by the tracer device, the span of telemetry information;
receiving, by the tracer device, a signal from the root span tracer to share the span of telemetry information regarding the transaction trace that was temporarily cached based on a decision being made by a particular one of the plurality of tracer devices that is downstream from the tracer device to send an indication of a trigger event; and
sharing, by the tracer device, the span of telemetry information with a telemetry collector in response to the signal to share, wherein tracers subsequent to the particular one of the plurality of tracer devices bypass caching in response to the signal and send their spans of telemetry information regarding the transaction trace to the telemetry collector.

8. The method as in claim 7, further comprising:
purging the span of telemetry information in response to not receiving a signal to share prior to a cache-based expiration.

9. The method as in claim 7, further comprising:
collecting a plurality of spans of telemetry information corresponding to a plurality of transaction traces passing through the tracer device, wherein the signal to share comprises a trace identifier indicative of a specific transaction trace of the plurality of transaction traces.

10. The method as in claim 7, further comprising:
detecting a trigger event for the transaction trace; and
transmitting an indication of the trigger event upstream to the root span tracer to cause the root span tracer to decide whether to trigger a sharing of a plurality of spans of telemetry information regarding the transaction trace, wherein the signal to share is from the root span tracer in response to deciding to trigger the sharing.

11. The method as in claim 10, wherein the tracer device is an intermediate tracer device at a given span along the transaction trace.

12. The method as in claim 11, further comprising:
transmitting a downstream signal to one or more downstream tracer devices of the transaction trace to cause the one or more downstream tracer devices to each share a respective span of telemetry information regarding the transaction trace with the telemetry collector.

13. The method as in claim 10, wherein the tracer device is an end device of the transaction trace, and wherein the trigger event for the transaction trace occurred at a given span along the transaction trace from a particular upstream tracer device.

14. The method as in claim 10, wherein the indication of the trigger event is transmitted through one of either hypertext transmission protocol return packet header signaling or in-band full duplex telemetry collection signaling.

15. The method as in claim 7, further comprising:
receiving the signal as one of either an in-band signal within a header of a subsequent transaction trace or an out-of-band signal.

16. A system, comprising:
a telemetry collector;
a root span tracer of a plurality of tracer devices configured to initiate a transaction trace; and
a plurality of downstream tracers of the plurality of tracer devices downstream from the root span tracer through which pass the transaction trace, the plurality of downstream tracers configured to collect a temporarily cached span of telemetry information regarding the transaction trace, a particular one of the plurality of downstream tracers configured to detect a trigger event for the transaction trace and transmit an indication of the trigger event upstream to the root span tracer, wherein the root span tracer is further configured to decide to send a signal to trigger a sharing of the temporarily cached span of telemetry information regarding the transaction trace from each of the plurality of downstream tracers in response to the indication of the trigger event, wherein the plurality of downstream tracers are further configured to share their temporarily cached span of telemetry information regarding the transaction trace with the telemetry collector in response to receiving the signal, and wherein tracers subsequent to the particular one of the plurality of tracer devices bypass caching in response to receiving the signal and send their spans of telemetry information regarding the transaction trace to the telemetry collector.

17. The system as in claim 16, wherein the indication of the trigger event is based on hypertext transmission protocol return packet header signaling.

18. The system as in claim 16, wherein the signal to the plurality of tracer devices comprises an in-band signal within a header of a subsequent transaction trace.

* * * * *

UNITED STATES PATENT AND TRADEMARK OFFICE
CERTIFICATE OF CORRECTION

| | | |
|---|---|---|
| PATENT NO. | : 12,021,725 B1 | Page 1 of 1 |
| APPLICATION NO. | : 17/749405 | |
| DATED | : June 25, 2024 | |
| INVENTOR(S) | : Walter Theodore Hulick, Jr. et al. | |

It is certified that error appears in the above-identified patent and that said Letters Patent is hereby corrected as shown below:

In the Claims

Column 21, Line 10 please amend as shown:
receiving, by the root span tracer, an indication of Column 21, Line 15 please amend as shown:
event, whether to trigger sharing of the temporarily Signed and Sealed this
Eighth Day of October, 2024

Katherine Kelly Vidal
*Director of the United States Patent and Trademark Office*